US012786732B2

(12) United States Patent
Ren et al.

(10) Patent No.: US 12,786,732 B2

(45) Date of Patent: Nov. 3, 2026

(54) RADIO RESOURCE ARBITRATION FOR SPECTRUM SHARING

(71) Applicant: Telefonaktiebolaget LM Ericsson (publ), Stockholm (SE)

(72) Inventors: Hong Ren, Kanata (CA); Christer Henriksson, Norsborg (SE); Patrick Sheehy, Sollentuna (SE); Steve Benson, Kanata (CA); Mike Russell, Nepean (CA); Shuming Tan, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 361 days.

(21) Appl. No.: 18/575,472

(22) PCT Filed: Jul. 7, 2021

(86) PCT No.: PCT/IB2021/056107

§ 371 (c)(1),
(2) Date: Dec. 29, 2023

(87) PCT Pub. No.: WO2023/281298

PCT Pub. Date: Jan. 12, 2023

(65) Prior Publication Data

US 2024/0323699 A1 Sep. 26, 2024

(51) Int. Cl.
*H04W 16/14* (2009.01)
*H04W 72/0446* (2023.01)
(Continued)

(52) U.S. Cl.
CPC ....... *H04W 16/14* (2013.01); *H04W 72/0446* (2013.01); *H04W 72/1215* (2013.01); *H04W 72/566* (2023.01)

(58) Field of Classification Search
None
See application file for complete search history.

(56) References Cited

U.S. PATENT DOCUMENTS

| | | | | |
|---|---|---|---|---|
| 2020/0137780 | A1* | 4/2020 | Kim | H04W 72/0453 |
| 2020/0404620 | A1* | 12/2020 | Sang | H04W 24/10 |

(Continued)

FOREIGN PATENT DOCUMENTS

| | | | |
|---|---|---|---|
| WO | 2019041350 | A1 | 3/2019 |
| WO | 2021019276 | A1 | 2/2021 |
| WO | 2021022395 | A1 | 2/2021 |

OTHER PUBLICATIONS

International Search Report and Written Opinion dated Feb. 22, 2022 issued in PCT Application No. PCT/IB2021/056107 filed Jul. 7, 2021, consisting of 12 pages.

*Primary Examiner* — Iqbal Zaidi
*Assistant Examiner* — Andrew Shaji Kurian
(74) *Attorney, Agent, or Firm* — Weisberg I.P. Law, P.A.

(57) ABSTRACT

A method and network node for radio resource arbitration for spectrum sharing are disclosed. According to one aspect, the method includes determining a demand for resources for a first RAT and for a second RAT and performing one of assuming a preferred resource split ratio of 1 to n between the first RAT and the second RAT when both RATs have enough demand, n being an integer greater than 1, and determining a subframe pattern of 1:1:1:2n−1. The method also includes assuming a preferred resource split ratio of n to 1 between the first RAT and the second RAT when both RATs have enough demand, then determining a subframe pattern of n:1.

16 Claims, 8 Drawing Sheets

(51) Int. Cl.
*H04W 72/12* (2023.01)
*H04W 72/566* (2023.01)

(56) References Cited

U.S. PATENT DOCUMENTS

| | | | | |
|---|---|---|---|---|
| 2022/0167309 | A1* | 5/2022 | Kim | H04B 17/347 |
| 2023/0140213 | A1* | 5/2023 | Awadin | H04L 5/0012<br>370/329 |
| 2023/0217432 | A1* | 7/2023 | Li | H04W 72/1268 |
| 2023/0403747 | A1* | 12/2023 | Sun | H04L 5/0053 |
| 2024/0106609 | A1* | 3/2024 | Zhang | H04W 72/232 |
| 2025/0261211 | A1* | 8/2025 | Zhou | H04L 5/0094 |

* cited by examiner

| | | | | | | | | |
|---|---|---|---|---|---|---|---|---|
| | DL RESOURCE ARBITRATION | DL NR/LTE SCHEDULER | | NR/LTE PDCCH PDSCH | | | | |
| K2=4 | UL RESOURCE ARBITRATION | UL NR/LTE SCHEDULER | | | | | | NR/LTE PUSCH |
| K2=2 | | | | NR DL/UL SCHEDULER | | NR PDCCH | | NR PUSCH |
| | n−1 | n | n+1 | n+2 | n+3 | n+4 | n+5 | n+6 |

FIG. 6

RADIO RESOURCE ARBITRATION FOR SPECTRUM SHARING

CROSS-REFERENCE TO RELATED APPLICATION

This application is a Submission Under 35 U.S.C. § 371 for U.S. National Stage Patent Application of International Application Number: PCT/IB2021/056107, filed Jul. 7, 2021 entitled "RADIO RESOURCE ARBITRATION FOR SPECTRUM SHARING," the entirety of which is incorporated herein by reference.

TECHNICAL FIELD

Wireless communication and in particular, to radio resource arbitration for spectrum sharing.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Wireless communication systems according to the 3GPP may include the following channels:

A physical downlink control channel, PDCCH;
A physical uplink control channel, PUCCH;
A physical downlink shared channel, PDSCH;
A physical uplink shared channel, PUSCH;
A physical broadcast channel, PBCH; and
A physical random access channel, PRACH.

Wireless operators around the world have already begun to deploy NR. When NR penetration is low at the beginning of the deployment, allocating a dedicated spectrum to NR can be a waste of radio resources when the spectrum cannot be fully utilized by NR. Spectrum sharing provides the capability to allow NR and LTE to share the same spectrum. It enables operators to introduce NR while serving LTE users in the same spectrum. FIG. 1 illustrates one option of spectrum sharing. In this case, radio resources are dynamically allocated to NR and LTE in each subframe (with duration of 1 msec).

For spectrum sharing, the resource blocks (RBs) in the same spectrum are shared between LTE and NR. The RBs can be divided based at least in part on estimated demand from LTE and NR, and this is referred to as resource arbitration. The resource arbitration needs to be done for both downlink (DL) and uplink (UL).

For NR PDSCH transmission, NR introduces a slot offset, $K_0$, which is the offset in terms of slot between the DL assignment that schedule the PDSCH and the actual PDSCH transmission. Similarly, there is a slot offset for PUSCH transmission, $K_2$, which is the offset in terms of slot between the UL grant that schedule the PUSCH and the actual PUSCH transmission.

For spectrum sharing, one solution is to perform resource arbitration one subframe before the scheduling. Then, NR and LTE schedulers can perform scheduling independently with the resource blocks (RBs) assigned by resource arbitration. The first two orthogonal frequency division multiplexed (OFDM) symbols are always reserved for the LTE PDCCH. The third OFDM symbol can be given to the LTE PDCCH or the NR PDCCH depending on the DL resource arbitration. When the third symbol is also given to LTE, then LTE can use up to 3 symbols for the PDCCH. If the third symbol is not given to LTE, the NR PDCCH can use the symbol for all RBs or only certain RBs. The DL RBs assigned to NR include RBs intended for both the NR PDSCH and the NR PDCCH. The DL RBs assigned to LTE include only RBs intended for the LTE PDSCH.

For LTE DL, the DL assignment on the PDCCH and the actual PDSCH are transmitted in the same subframe. For NR DL, when $K_0=0$, the DL assignment on the PDCCH and the actual PDSCH are also transmitted in the same subframe. Note the actual scheduling at the NR base station (gNB) and the LTE base station (eNB) happens before the PDCCH/PDSCH transmission. Assume NR and LTE DL scheduling is 2 subframes before the PDCCH/PDSCH transmission, then DL resource arbitration should be performed 3 subframes before the PDCCH/PDSCH transmission.

The situation for UL is much more complicated. For LTE UL, the UL grant on the PDCCH is transmitted 4 subframes before the PUSCH transmission. For LTE random access message 3, the UL grant is carried on the PDSCH and is transmitted 6 subframes before the PUSCH transmission. For NR UL, $K_2$ can take different values for different type of traffic. For example, $K_2$ can be 2 for regular user traffic and be 4 for aperiodic channel state information (CSI, A-CSI) reports. Also, the UL grant for random access message 3 is carried on the PDSCH and is transmitted 4 subframes before the PUSCH transmission. Assuming NR and LTE UL scheduling is 2 subframes before the PDCCH transmission (for the UL grant), the actual PUSCH transmission can be in different subframes, depending on the delay between the UL grant and the PUSCH transmission. See FIG. 2. This makes the UL resource arbitration quite difficult.

Another problem is the coordination between UL resource arbitration and DL resource arbitration. The NR PUSCH, needs UL RBs and also needs DL RBs to carry the UL grant (PDCCH) for the PUSCH. Even when UL RBs are assigned to NR, when there is no NR PDCCH resource for the UL grant, no NR UL data can be transmitted. Thus, the lack of coordination would lead to poor NR UL throughput and radio resource waste.

In addition, wireless service providers want to have the capability to favor either NR or LTE when DL/UL RBs are divided. Basically, wireless service provider would like to give either NR or LTE higher priority in more subframes when dividing RBs. This is referred to as policy-based biasing. This biasing can further complicate the coordination issue.

One simple solution to the problem is to divide the RBs in a subframe based at least in part on the ratio of the NR and LTE demand. For example, when NR demands 50 DL RBs while LTE demands 100 DL RBs, The DL RBs are divided based at least in part on a ratio of 1:2. This will ensure NR gets some DL RBs as long as it has demand. There are some problems with this solution. First, it requires more PDCCH capacity. When the whole subframe is assigned to LTE, it may be possible to empty a buffer of one wireless device (WD). When the RBs in the subframe are split, the WD's buffer cannot be completely emptied. The WD needs to be scheduled later, which means more PDCCH resources for the WD. Secondly, DL RBs are not utilized efficiently when DL RB allocation is at RBG (RB group) level. Since NR and LTE RBG boundaries are not aligned, some DL RBs are wasted.

Another simple solution is to use $K_2=4$ for NR regular user traffic. Of course, this would cause increased NR UL latency and it is not a good solution.

SUMMARY

Some embodiments advantageously provide a method and system for radio resource arbitration for spectrum sharing.

According to one aspect, a method in a network node for arbitration of radio resources to share the radio resources between different radio access technologies, RATs. The method includes determining a demand for resources for a first RAT and for a second RAT; and performing one of: assuming a preferred resource split ratio of 1 to n between the first RAT and the second RAT when both RATs have enough demand, n being an integer greater than 1, and determining a subframe pattern of 1:1:1:2n−1, a subframe pattern of 1:1:1:2n−1 meaning that the first RAT has higher priority than the second RAT to obtain radio resources in one subframe, followed by a subframe for which the second RAT has higher priority than the first RAT to obtain radio resources, followed by a subframe for which the first RAT has higher priority than the second RAT to obtain radio resources, followed by 2n−1 consecutive subframes for which the second RAT has higher priority than the first RAT to obtain radio resources; assuming a preferred resource split ratio of n to 1 between the first RAT and the second RAT when both RATs have enough demand, then determining a subframe pattern of n:1, a subframe pattern of n: 1 meaning that the first RAT has higher priority to obtain radio resources in n consecutive subframes, followed by a subframe for which the second RAT has higher priority to obtain radio resources; and assuming a preferred resource split ratio of 1 to 1 between the first RAT and the second RAT when both RATs have enough demand, then determining a subframe pattern of 1:1, a subframe pattern of 1:1 meaning that the first RAT has higher priority to obtain radio resources in a subframe, followed by a subframe for which the second RAT has higher priority to obtain radio resources.

According to this aspect, in some embodiments, the first RAT is New Radio, NR, and the second RAT is Long Term Evolution, LTE. In some embodiments, resource blocks of a subframe are assigned to communications of the higher priority RAT before remaining resource blocks of the subframe are assigned to communications of the lower priority RAT. In some embodiments, a subframe pattern repeats with some exceptions. In some embodiments, a subframe patterns can change dynamically. In some embodiments, the demand for resources for the first RAT is estimated for each of a plurality of first traffic priority groups and the demand for resources for the second RAT is estimated for each of a plurality of second traffic priority groups. In some embodiments, a subframe pattern is performed separately for downlink transmissions and uplink transmissions. In some embodiments, a first number of time slots between a time of a downlink assignment for a downlink transmission and a time of the downlink transmission is zero and a second number of time slots between a time of an uplink assignment for an uplink transmission and a time of the uplink transmission is one of 2 and 4. In some embodiments, the method also includes determining a subframe pattern for uplink transmissions followed by determining a subframe pattern for downlink transmissions. In some embodiments, a time between a subframe pattern for uplink transmissions and a subframe pattern for downlink transmissions is based at least in part on at least one of: a delay between resource arbitration and downlink or uplink transmission scheduling; a delay between scheduling and transmission of a downlink assignment or uplink grant on a physical downlink control channel, PDCCH; a delay between transmission of a downlink assignment and a corresponding physical downlink shared channel, PDSCH transmission; a delay between transmission of an uplink grant and a corresponding physical uplink shared channel, PUSCH, transmission; and a time when uplink radio resources are arbitrated when multiple k2 values are supported.

According to another aspect, a network node configured for arbitration of radio resources to share the radio resources between different radio access technologies, RATs. The network node includes: processing circuitry configured to: determine a demand for resources for a first RAT and for a second RAT; and perform one of: assuming a preferred resource split ratio of 1 to n between the first RAT and the second RAT when both RATs have enough demand, n being an integer greater than 1, and determining a subframe pattern of 1:1:1:2n−1, a subframe pattern of 1:1:1:2n−1 meaning that the first RAT has higher priority than the second RAT to obtain radio resources in one subframe, followed by a subframe for which the second RAT has higher priority than the first RAT to obtain radio resources, followed by a subframe for which the first RAT has higher priority than the second RAT to obtain radio resources, followed by 2n−1 consecutive subframes for which the second RAT has higher priority than the first RAT to obtain radio resources; assuming a preferred resource split ratio of n to 1 between the first RAT and the second RAT when both RATs have enough demand, then determining a subframe pattern of n:1, a subframe pattern of n:1 meaning that the first RAT has higher priority to obtain radio resources in n consecutive subframes, followed by a subframe for which the second RAT has higher priority to obtain radio resources; and assuming a preferred resource split ratio of 1 to 1 between the first RAT and the second RAT when both RATs have enough demand, then determining a subframe pattern of 1:1, a subframe pattern of 1:1 meaning that the first RAT has higher priority to obtain radio resources in a subframe, followed by a subframe for which the second RAT has higher priority to obtain radio resources.

According to this aspect, in some embodiments, the first RAT is New Radio, NR, and the second RAT is Long Term Evolution, LTE. In some embodiments, resource blocks of a subframe are assigned to communications of the higher priority RAT before remaining resource blocks of the subframe are assigned to communications of the lower priority RAT. In some embodiments, a subframe pattern repeats with some exceptions. In some embodiments, a subframe patterns can change dynamically. In some embodiments, the demand for resources for the first RAT is estimated for each of a plurality of first traffic priority groups and the demand for resources for the second RAT is estimated for each of a plurality of second traffic priority groups. In some embodiments, of a subframe pattern is performed separately for downlink transmissions and uplink transmissions. In some embodiments, a first number of time slots between a time of a downlink assignment for a downlink transmission and a time of the downlink transmission is zero and a second number of time slots between a time of an uplink assignment for an uplink transmission and a time of the uplink transmission is one of 2 and 4. In some embodiments, the processing circuitry is further configured to determine a subframe pattern for uplink transmissions followed by determining a subframe pattern for downlink transmissions. In some embodiments, a time between a subframe pattern for uplink transmissions and a subframe pattern for downlink transmissions is based at least on at least one of: a delay between resource arbitration and downlink or uplink transmission scheduling; a delay between scheduling and transmission of a downlink assignment or uplink grant on a physical downlink control channel, PDCCH; a delay between transmission of a downlink assignment and a corresponding physical downlink shared channel, PDSCH transmission; a delay between transmission of an uplink grant and a corresponding physical uplink shared channel, PUSCH, transmission; and a time when uplink radio resources are arbitrated when multiple k2 values are supported.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is an illustration of spectrum sharing between LTE and NR according to principles set forth herein;

DETAILED DESCRIPTION

Figure 1:
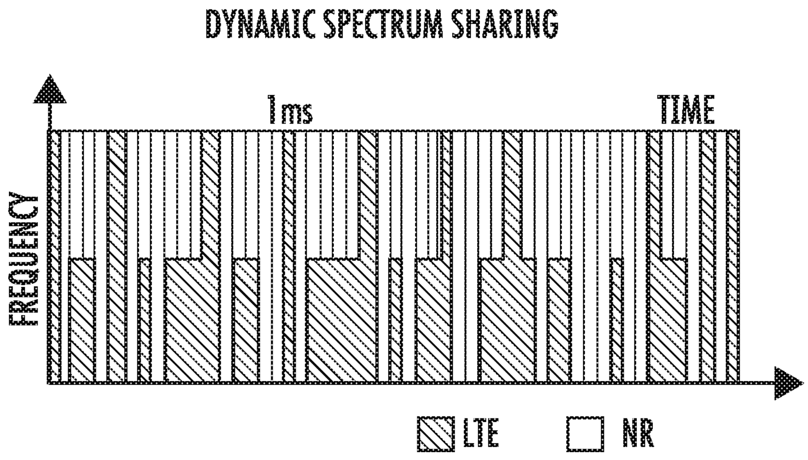
FIG. 1 is an illustration of known spectrum sharing between LTE and NR.
Figure 2:
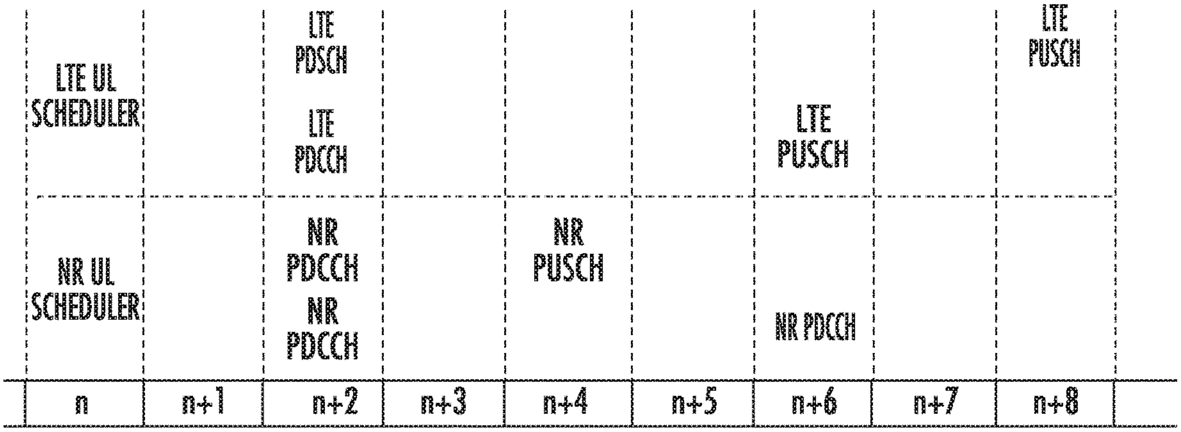
FIG. 2 is an illustration of spectrum sharing between LTE and NR according to principles set forth herein.

Before describing in detail example embodiments, it is noted that the embodiments reside primarily in combinations of apparatus components and processing steps related to radio resource arbitration for spectrum sharing. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising.” “includes” and/or “including” when used herein, specify the presence of stated features, integers, steps, operations, elements, and/or components, but do not preclude the presence or addition of one or more other features, integers, steps, operations, elements, components, and/or groups thereof.

The term “network node” used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term “radio node” used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
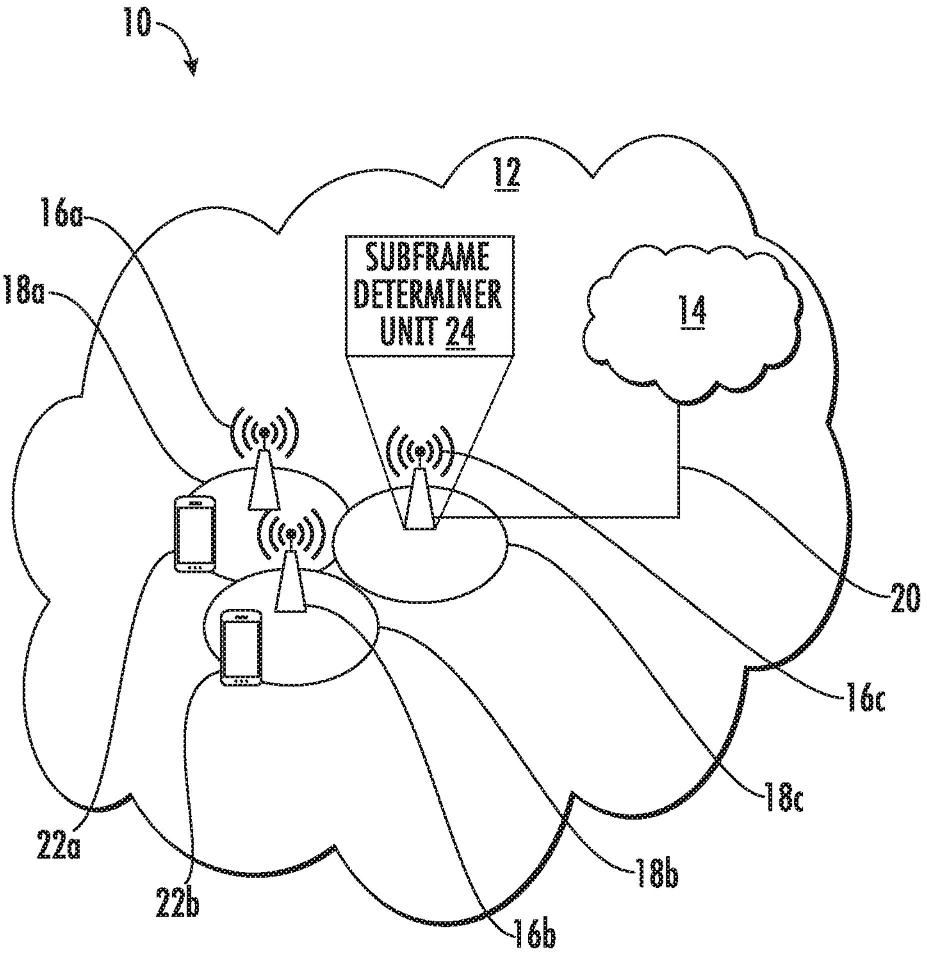
FIG. 3 is a schematic diagram of an example network architecture illustrating a communication system according to principles disclosed herein.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (eNB or gNB) is configured to include a subframe determiner unit determining a subframe pattern of 1:1:1:2n−1 or a subframe pattern of n:1.

Example implementations, in accordance with an embodiment, of the WD 22 and network node 16 discussed in the preceding paragraphs will now be described with reference to FIG. 4.

The communication system 10 includes a network node 16 provided in a communication system 10 and including hardware 28 enabling it to communicate with the WD 22. The hardware 28 may include a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include a subframe determiner unit determining a subframe pattern of 1:1:1:2n−1 or a subframe pattern of n:1.

The communication system 10 further includes the WD 22 already referred to. The WD 22 may have hardware 44 that may include a radio interface 46 configured to set up and maintain a wireless connection 32 with a network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

Figure 4:
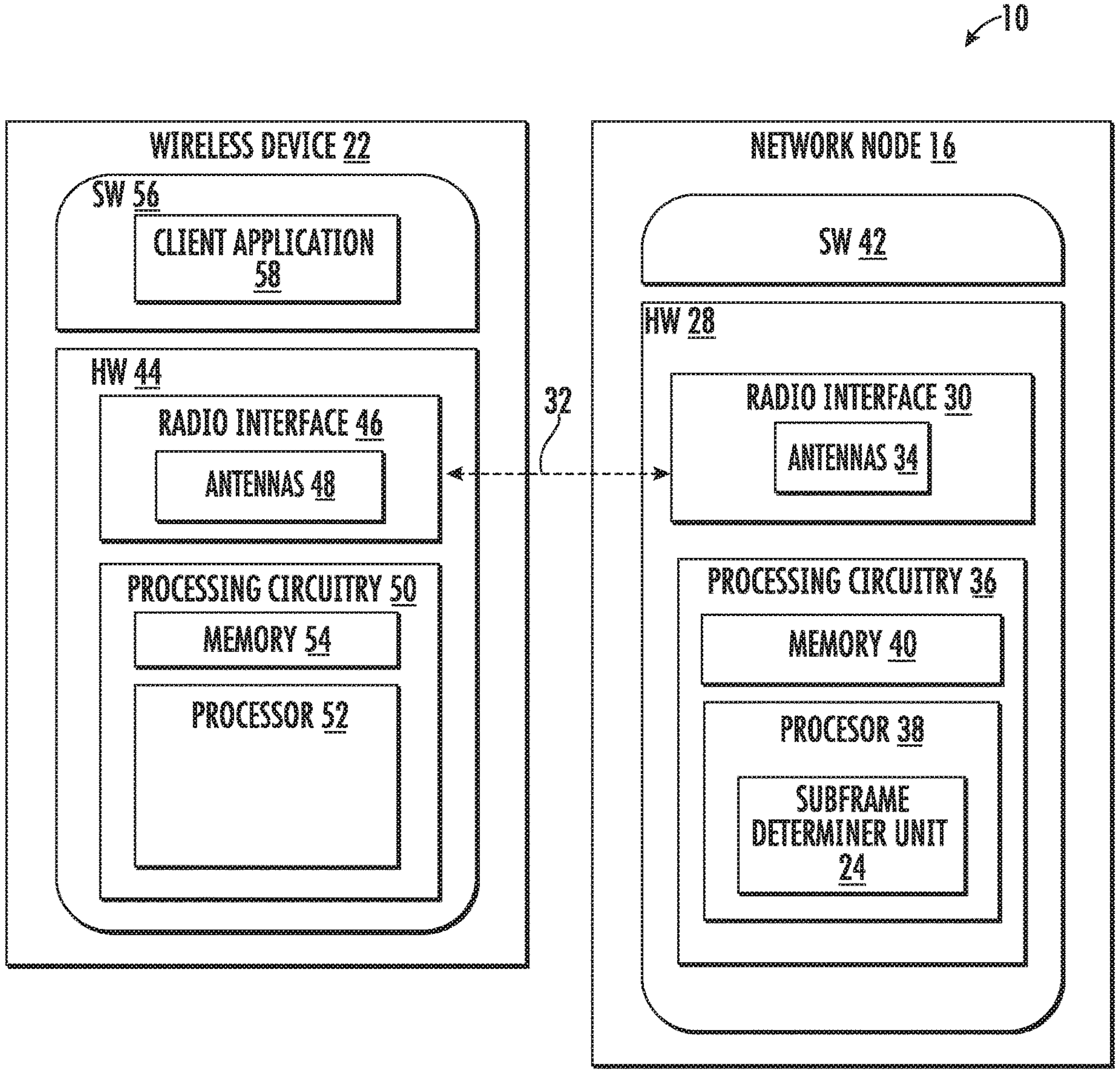
FIG. 4 is a block diagram of a network node in communication with a wireless device over a wireless connection according to some embodiments of the present disclosure.

In some embodiments, the inner workings of the network node 16 and WD 22 may be as shown in FIG. 4 and independently, the surrounding network topology may be that of FIG. 3.

The wireless connection 32 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 3 and 4 show various "units" such as subframe determiner unit 24 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
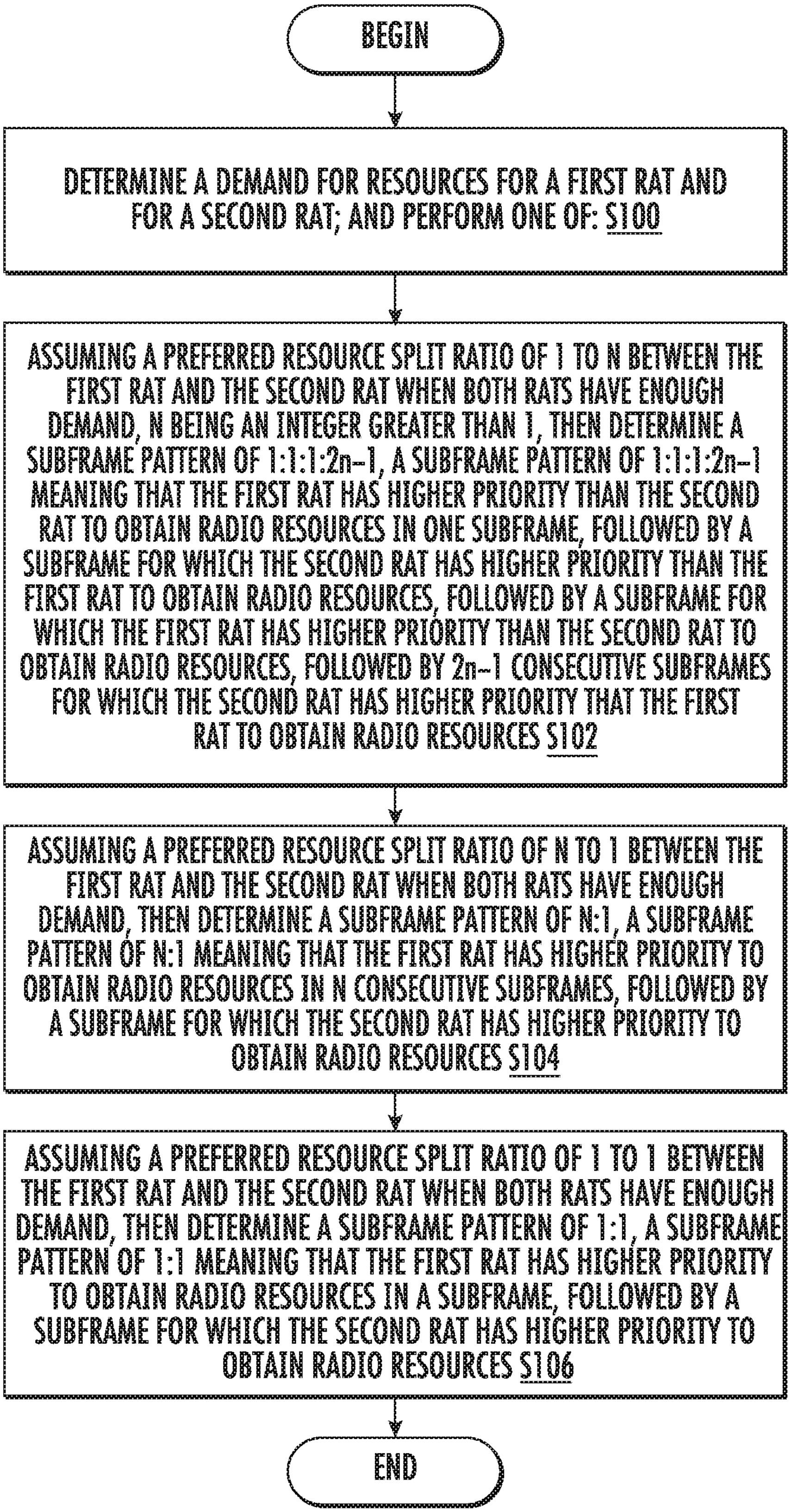
FIG. 5 is a flowchart of an example process in a network node for radio resource arbitration for spectrum sharing.

FIG. 5 is a flowchart of an example process in a network node 16 for radio resource arbitration for spectrum sharing. One or more blocks described herein may be performed by one or more elements of network node 16 such as by one or more of processing circuitry 36 (including the subframe determining unit 24), processor 38, and/or radio interface 30. Network node 16 such as via processing circuitry 36 and/or processor 38 and/or radio interface 30 is configured to determine a demand for resources for a first RAT and for a second RAT, (Block S100) and performing one of: assuming a preferred resource split ratio of 1 to n between the first RAT and the second RAT when both RATs have enough demand, n being an integer greater than 1, and determining a subframe pattern of 1:1:1:2n−1, a subframe pattern of 1:1:1:2n−1 meaning that the first RAT has higher priority than the second RAT to obtain radio resources in one subframe, followed by a subframe for which the second RAT has higher priority than the first RAT to obtain radio resources, followed by a subframe for which the first RAT has higher priority than the second RAT to obtain radio resources, followed by 2n−1 consecutive subframes for which the second RAT has higher priority than the first RAT to obtain radio resources (Block S102). The process also includes assuming a preferred resource split ratio of n to 1 between the first RAT and the second RAT when both RATs have enough demand, then determining a subframe pattern of n:1, a subframe pattern of n:1 meaning that the first RAT has higher priority to obtain radio resources in n consecutive subframes, followed by a subframe for which the second RAT has higher priority to obtain radio resources (Block S104). The process further includes, assuming a preferred resource split ratio of 1 to 1 between the first RAT and the second RAT when both RATs have enough demand, then determining a subframe pattern of 1:1, a subframe pattern of 1:1 meaning that the first RAT has higher priority to obtain radio resources in a subframe, followed by a subframe for which the second RAT has higher priority to obtain radio resources (Block S106).

Having described the general process flow of arrangements of the disclosure and having provided examples of hardware and software arrangements for implementing the processes and functions of the disclosure, the sections below provide details and examples of arrangements for radio resource arbitration for spectrum sharing.

Some embodiments have at least one of the following advantages:

Improve throughput and user experience;

Minimize resource waste; and/or

Minimize starvation of any types of traffic.

In this disclosure, a spectrum sharing (SS) cell refers to a cell that provide both LTE and NR services. Both LTE and NR signals and channels can be transmitted by the SS cell.

To simplify the description, assume that for the NR DL, $K_0$=0. For NR UL, $K_2$ can be 4 or 2. The solution described below can be used with straight-forward modifications when $K_0$ and $K_2$ can take different values.

For UL resource arbitration, assuming the resource arbitration is done one subframe before scheduling, the question arises as to what resources are for which subframe given that the PUSCH can be transmitted in different subframes.

According to some embodiments, the resource arbitration is performed for the PUSCH with $K_2$=4. This $K_2$ is common for NR and LTE although $K_2$ is not explicitly defined in LTE. There is also PUSCH transmissions in other subframes.

For the LTE PUSCH for LTE message 3, there is a largest delay between UL scheduling and the corresponding PUSCH transmission. In this case, LTE is assigned the resources needed to carry LTE message 3. For the NR PUSCH with $K_2$=2, demand is taken into account when performing resource arbitration for the PUSCH with $K_2$=4. Basically, for UL resource arbitration, the demand can be from multiple $K_2$ values. This ensures that the NR UL traffic with $K_2$=2 is not starved. This also means that not all UL RBs assigned to NR will be used immediately for the PUSCH with $K_2$=4. Most of the RBs are likely used later for the PUSCH with $K_2$=2. See FIG. 6. Please note the figure is for the specific $K_2$ values mentioned here. The principles described here apply to other $K_2$ values.

There are other potential issues to consider:

In subframe n−1, when some UL RBs are assigned to NR but no DL RBs are assigned to NR, no NR UL traffic with $K_2$=4 can be scheduled in subframe n since there are no DL RBs to carry the UL grant for $K_2$=4; and Assume that both UL and DL RBs are assigned to NR when doing resource arbitration in subframe n−1. Since the traffic demand for $K_2$=2 is also considered when doing UL resource division for $K_2$=4, some of the UL RBs in subframe n+6 are intended for traffic with $K_2$=2. When no DL RBs are assigned to NR in subframe n+1, the NR UL scheduler can't schedule any UL transmissions with $K_2$=2 in subframe n+2 since there is no DL RBs to carry UL grants for $K_2$=2.

The following are proposed to address the problem described above:

Coordination within the same subframe;

In any subframe, when UL RBs are assigned to NR intended for traffic with $K_2$=4, DL resource arbitration should try to assign some DL RBs to NR so that UL grant for $K_2$=4 can be transmitted.

Coordination between different subframes.

In a subframe, when UL resource division determines to assign some UL RBs to NR and it is known that some of the RBs are intended for traffic with $K_2$=2, the DL resource division 2 subframes later may try to assign NR some DL RBs to carry the UL grant.

If DL RBs and UL RBs can be assigned to the NR in any subframe, then the coordination principles set forth herein can be followed. However, there are additional restrictions.

Figure 7:
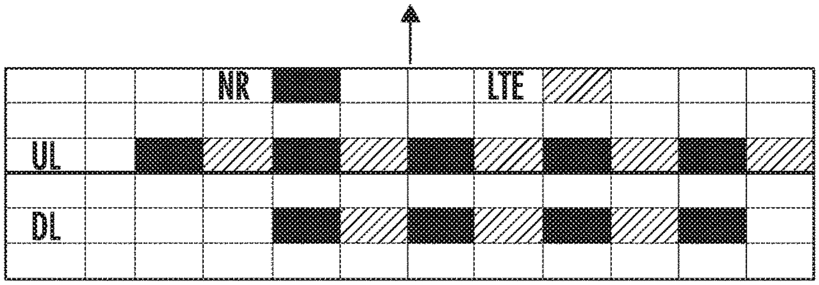
FIG. 7 is an illustration of a first example of LTE/NR scheduling.

For spectrum sharing, wireless operators want to control the resources assigned to NR relative to LTE when both NR and LTE have large demand. For example, one option is to assign roughly equal amounts of resources to NR and LTE. This may be referred to as a "fair" policy. This can be achieved by assign about equal amount of subframes to NR and LTE. Let's start from one subframe. In this subframe, NR traffic has higher priority. This subframe will be assigned to NR when NR has enough traffic to fill the whole subframe. When NR traffic can't fill the whole subframe, the remaining RBs can be assigned to LTE. Then LTE traffic has higher priority in the next subframe. This subframe will be assigned to LTE when LTE has enough traffic to fill the whole subframe. Similarly, when LTE traffic can't fill the whole subframe, the remaining RBs can be assigned to NR. This process goes on for the following subframes. With this option, it is easy to follow the coordination rules above. Specifically, the UL always alternate between NR and LTE. The DL can follow the UL pattern but with a delay of 2 subframes. FIG. 7 shows NR traffic has higher priority in NR subframes. But this doesn't mean those subframes are assigned entirely to NR. They are assigned to NR when NR has enough traffic. When NR doesn't have enough traffic, a certain number of RBs are assigned to NR based at least in part on NR demand. Also, FIG. 7 shows resource arbitration, which happens a few subframe earlier than the actual PDSCH or PUSCH transmissions over the air. The pattern in FIG. 7 allows UL/DL coordination within the same subframe as well as between different subframes. The DL pattern may be slightly different from the UL pattern due to multimedia broadcast multicast service over single frequency network (MBSFN) subframes. In MBSFN subframes, it is possible that only NR DL traffic can be transmitted. In this case, LTE subframes and NR subframes would not alternate all the time. One may see 3 NR subframes in a row since the pattern is punctured by MBSFN subframes, for example.

Figure 8:
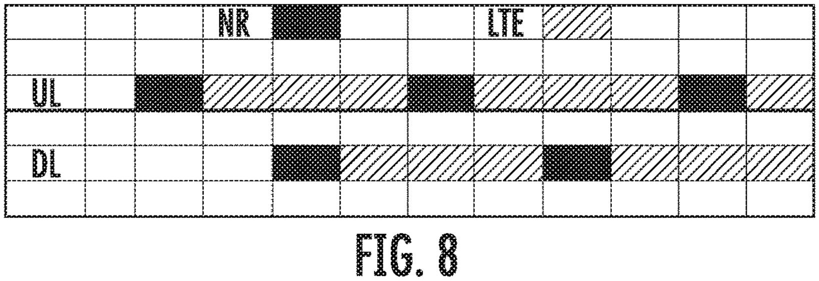
FIG. 8 is an illustration of a second example of LTE/NR scheduling.

Sometimes operators want to give LTE more resources. For example, the operators may want to split resources between NR and LTE in a ratio of about 1:3. In this case, a pattern of 1 NR subframe followed by 3 consecutive LTE subframes is not good. See FIG. 8. One can see that this pattern allows coordination between different subframes, but it fails to coordinate within the same subframe. One can shift the DL pattern to enable coordination within the same subframe, but then the coordination between different subframes is lost.

Figure 9:
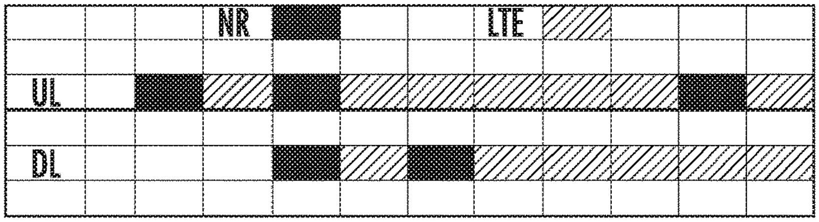
FIG. 9 is an illustration of a third example of LTE/NR scheduling.

An example of a pattern to solve the coordination issue in this case is shown in FIG. 9. The pattern is 1:1:1:5 (1 NR subframe, followed by 1 LTE subframe, followed by 1 NR subframe and then followed by 5 LTE subframes). This pattern satisfies the NR to LTE resource ratio of 1:3 and it allows coordination within the same subframe as well as coordination between different subframes. Unlike the "fair" case where in-subframe coordination is achieved in every other subframe, the in-subframe coordination is achieved every 8 subframes. This means that NR UL traffic with $K_2$=4 may be delayed by up to 8 ms. The impact due to this is not significant in most cases. Similarly, when there are some MBSFN subframes and they can only be used for NR DL, the DL subframe pattern may be different from 1:1:1:5 at times.

Figure 10:
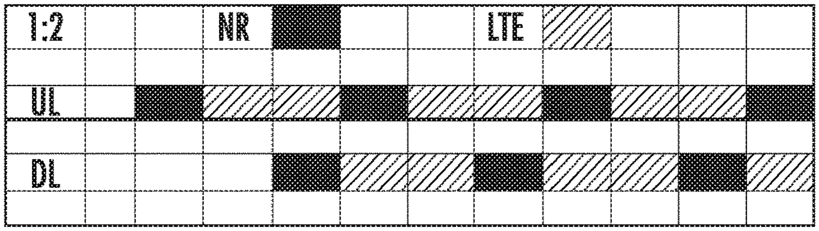
FIG. 10 is an illustration of a fourth example of LTE/NR scheduling.

A similar issue may arise when operators want to split resources between NR and LTE in a ratio of about 1:2. In this case, a pattern of 1 NR subframe followed by 2 consecutive LTE subframes does not work, as shown in FIG. 10. This pattern does not allow coordination both within a subframe and across different subframes.

Figure 11:
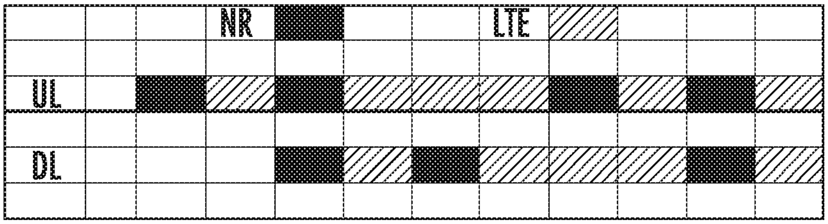
FIG. 11 is an illustration of a fifth example of LTE/NR scheduling.

In this case, the pattern in FIG. 11 may be employed. The pattern is 1:1:1:3 (1 NR subframe, followed by 1 LTE subframe, followed by 1 NR subframe and then followed by 3 LTE subframes).

In summary, when operators want to split resources between NR and LTE in a ratio of about 1:n (n>1), the pattern that allows UL and DL coordination is 1:1:1:2n−1 (1 NR subframe, followed by 1 LTE subframe, followed by 1 NR subframe and then followed by (2n−1) LTE subframes). Please note, although the proposed pattern allows coordination both within a subframe and across different subframes, the distance between two subframes in which NR has higher priority in both UL and DL increases with n. This means the UL traffic with $K_2$=4 may be delayed and the delay may increase with n. It is also noted that the DL pattern may be different from 1:1:1:2n−1 when MBSFN subframes are encountered.

Figure 12:
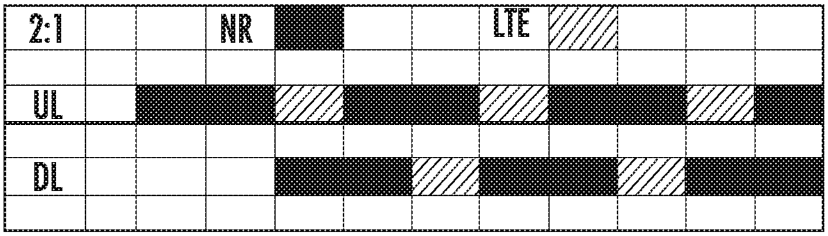
FIG. 12 is an illustration of a sixth example of LTE/NR scheduling.
Figure 13:
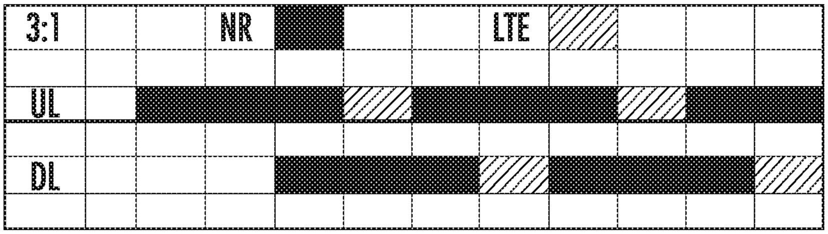
FIG. 13 is an illustration of a seventh example of LTE/NR scheduling.

On the other hand, when operators want to split resources between NR and LTE in a ratio of about n:1 (n>1), the pattern of n:1 (n NR subframe, followed by 1 LTE subframe) can be employed. The patterns for 2:1 and 3:1 are shown in FIGS. 12 and 13.

Both LTE and NR traffic can be divided into multiple priority groups. The demand can be estimated for each priority group. The biasing policy can be applied to one or more priority groups.

The biasing can be dynamically changed. For example, the quality of service (QoS) for each priority group can be monitored in real time. Based on the achieved QoS for one or more priority groups, a given biasing may be selected.

According to one aspect, a method in a network node 16 for arbitration of radio resources to share the radio resources between different radio access technologies, RATs. The method includes determining, via the processing circuitry 68, a demand for resources for a first RAT and for a second RAT; and performing one of: assuming a preferred resource split ratio of 1 to n between the first RAT and the second RAT when both RATs have enough demand, n being an integer greater than 1, and determining a subframe pattern of 1:1:1:2n−1, a subframe pattern of 1:1:1:2n−1 meaning that the first RAT has higher priority than the second RAT to obtain radio resources in one subframe, followed by a subframe for which the second RAT has higher priority than the first RAT to obtain radio resources, followed by a subframe for which the first RAT has higher priority than the second RAT to obtain radio resources, followed by 2n−1 consecutive subframes for which the second RAT has higher priority than the first RAT to obtain radio resources; assuming a preferred resource split ratio of n to 1 between the first RAT and the second RAT when both RATs have enough demand, then determining a subframe pattern of n:1, a subframe pattern of n:1 meaning that the first RAT has higher priority to obtain radio resources in n consecutive subframes, followed by a subframe for which the second RAT has higher priority to obtain radio resources; and assuming a preferred resource split ratio of 1 to 1 between the first RAT and the second RAT when both RATs have enough demand, then determining a subframe pattern of 1:1, a subframe pattern of 1:1 meaning that the first RAT has higher priority to obtain radio resources in a subframe, followed by a subframe for which the second RAT has higher priority to obtain radio resources According to this aspect, in some embodiments, the first RAT is New Radio, NR, and the second RAT is Long Term Evolution, LTE. In some embodiments, resource blocks of a subframe are assigned to communications of the higher priority RAT before remaining resource blocks of the subframe are assigned to communications of the lower priority RAT. In some embodiments, a subframe pattern repeats with some exceptions. In some embodiments, a subframe patterns can change dynamically. In some embodiments, the demand for resources for the first RAT is estimated for each of a plurality of first traffic priority groups and the demand for resources for the second RAT is estimated for each of a plurality of second traffic priority groups. In some embodiments, a subframe pattern is performed separately for downlink transmissions and uplink transmissions. In some embodiments, a first number of time slots between a time of a downlink assignment for a downlink transmission and a time of the downlink transmission is zero and a second number of time slots between a time of an uplink assignment for an uplink transmission and a time of the uplink transmission is one of 2 and 4. In some embodiments, the method also includes determining a subframe pattern for uplink transmissions followed by determining a subframe pattern for downlink transmissions. In some embodiments, a time between a subframe pattern for uplink transmissions and a subframe pattern for downlink transmissions is based at least in part on at least one of: a delay between resource arbitration and downlink or uplink transmission scheduling; a delay between scheduling and transmission of a downlink assignment or uplink grant on a physical downlink control channel, PDCCH; a delay between transmission of a downlink assignment and a corresponding physical downlink shared channel, PDSCH transmission; a delay between transmission of an uplink grant and a corresponding physical uplink shared channel, PUSCH, transmission; and a time when uplink radio resources are arbitrated when multiple k2 values are supported.

According to another aspect, a network node 16 configured for arbitration of radio resources to share the radio resources between different radio access technologies, RATs. The network node 16 includes: processing circuitry 68 configured to: determine a demand for resources for a first RAT and for a second RAT; and perform one of: assuming a preferred resource split ratio of 1 to n between the first RAT and the second RAT when both RATs have enough demand, n being an integer greater than 1, and determining a subframe pattern of 1:1:1:2n−1, a subframe pattern of 1:1:1:2n−1 meaning that the first RAT has higher priority than the second RAT to obtain radio resources in one subframe, followed by a subframe for which the second RAT has higher priority than the first RAT to obtain radio resources, followed by a subframe for which the first RAT has higher priority than the second RAT to obtain radio resources, followed by 2n−1 consecutive subframes for which the second RAT has higher priority than the first RAT to obtain radio resources; assuming a preferred resource split ratio of n to 1 between the first RAT and the second RAT when both RATs have enough demand, then determining a subframe pattern of n:1, a subframe pattern of n:1 meaning that the first RAT has higher priority to obtain radio resources in n consecutive subframes, followed by a subframe for which the second RAT has higher priority to obtain radio resources; and assuming a preferred resource split ratio of 1 to 1 between the first RAT and the second RAT when both RATs have enough demand, then determining a subframe pattern of 1:1, a subframe pattern of 1:1 meaning that the first RAT has higher priority to obtain radio resources in a subframe, followed by a subframe for which the second RAT has higher priority to obtain radio resources.

According to this aspect, in some embodiments, the first RAT is New Radio, NR, and the second RAT is Long Term Evolution, LTE. In some embodiments, resource blocks of a subframe are assigned to communications of the higher priority RAT before remaining resource blocks of the subframe are assigned to communications of the lower priority RAT. In some embodiments, a subframe pattern repeats with some exceptions. In some embodiments, a subframe patterns can change dynamically. In some embodiments, the demand for resources for the first RAT is estimated for each of a plurality of first traffic priority groups and the demand for resources for the second RAT is estimated for each of a plurality of second traffic priority groups. In some embodiments, of a subframe pattern is performed separately for downlink transmissions and uplink transmissions. In some embodiments, a first number of time slots between a time of a downlink assignment for a downlink transmission and a time of the downlink transmission is zero and a second number of time slots between a time of an uplink assignment for an uplink transmission and a time of the uplink transmission is one of 2 and 4. In some embodiments, the processing circuitry 68 is further configured to determine a subframe pattern for uplink transmissions followed by determining a subframe pattern for downlink transmissions. In some embodiments, a time between a subframe pattern for uplink transmissions and a subframe pattern for downlink transmissions is based at least in part on at least one of: a delay between resource arbitration and downlink or uplink transmission scheduling; a delay between scheduling and transmission of a downlink assignment or uplink grant on a physical downlink control channel, PDCCH; a delay between transmission of a downlink assignment and a corresponding physical downlink shared channel, PDSCH transmission; a delay between transmission of an uplink grant and a corresponding physical uplink shared channel, PUSCH, transmission; and a time when uplink radio resources are arbitrated when multiple k2 values are supported.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for arbitration of radio resources to share the radio resources between different radio access technologies, RATs, the method comprising:

determining a demand for resources for a first RAT and for a second RAT; and determining a preferred resource split ratio of 1 to n between the first RAT and the second RAT based on both RATs having enough demand, n being an integer greater than 1, and determining a subframe pattern of 1:1:1:2n−1, a subframe pattern of 1:1:1:2n−1 meaning that the first RAT has higher priority than the second RAT to obtain radio resources in one subframe, followed by a subframe for which the second RAT has higher priority than the first RAT to obtain radio resources, followed by a subframe for which the first RAT has higher priority than the second RAT to obtain radio resources, followed by 2n−1 consecutive subframes for which the second RAT has higher priority than the first RAT to obtain radio resources;

determining a preferred resource split ratio of n to 1 between the first RAT and the second RAT based on both RATs having enough demand, in response to determining a subframe pattern of n:1, a subframe pattern of n:1 meaning that the first RAT has higher priority to obtain radio resources in n consecutive subframes, followed by a subframe for which the second RAT has higher priority to obtain radio resources; and determining a preferred resource split ratio of 1 to 1 between the first RAT and the second RAT based on both RATs having enough demand, in response to determining a subframe pattern of 1:1, a subframe pattern of 1:1 meaning that the first RAT has higher priority to obtain radio resources in a subframe, followed by a subframe for which the second RAT has higher priority to obtain radio resources; and a time between a subframe pattern for uplink transmissions and a subframe pattern for downlink transmissions being based at least in part on at least one of:

a delay between resource arbitration and downlink or uplink transmission scheduling;

a delay between scheduling and transmission of a downlink assignment or uplink grant on a physical downlink control channel, PDCCH;

a delay between transmission of a downlink assignment and a corresponding physical downlink shared channel, PDSCH transmission;

a delay between transmission of an uplink grant and a corresponding physical uplink shared channel, PUSCH, transmission; and a time when uplink radio resources are arbitrated when multiple k2 values are supported.

2. The method of claim 1, wherein the first RAT is New Radio, NR, and the second RAT is Long Term Evolution, LTE.

3. The method of claim 1, wherein resource blocks of a subframe are assigned to communications of the higher priority RAT before remaining resource blocks of the subframe are assigned to communications of the lower priority RAT.

4. The method of claim 1, wherein a subframe pattern repeats.

5. The method of claim 1, wherein a subframe patterns can change dynamically.

6. The method of claim 1, wherein the demand for resources for the first RAT is estimated for each of a plurality of first traffic priority groups and the demand for resources for the second RAT is estimated for each of a plurality of second traffic priority groups.

7. The method of claim 1, wherein of a subframe pattern is performed separately for downlink transmissions and uplink transmissions.

8. The method of claim 1, wherein a first number of time slots between a time of a downlink assignment for a downlink transmission and a time of the downlink transmission is zero and a second number of time slots between a time of an uplink assignment for an uplink transmission and a time of the uplink transmission is one of 2 and 4.

9. A network node configured for arbitration of radio resources to share the radio resources between different radio access technologies, RATs, the network node comprising processing circuitry configured to:

determine a demand for resources for a first RAT and for a second RAT; and assuming determine a preferred resource split ratio of 1 to n between the first RAT and the second RAT based on both RATs having enough demand, n being an integer greater than 1, and determining a subframe pattern of 1:1:1:2n−1, a subframe pattern of 1:1:1:2n−1 meaning that the first RAT has higher priority than the second RAT to obtain radio resources in one subframe, followed by a subframe for which the second RAT has higher priority than the first RAT to obtain radio resources, followed by a subframe for which the first RAT has higher priority than the second RAT to obtain radio resources, followed by 2n−1 consecutive subframes for which the second RAT has higher priority than the first RAT to obtain radio resources;

determine a preferred resource split ratio of n to 1 between the first RAT and the second RAT based on both RATs having enough demand, in response to determining a subframe pattern of n:1, a subframe pattern of n:1 meaning that the first RAT has higher priority to obtain radio resources in n consecutive subframes, followed by a subframe for which the second RAT has higher priority to obtain radio resources; and determine a preferred resource split ratio of 1 to 1 between the first RAT and the second RAT based on both RATs having enough demand, then in response to determining a subframe pattern of 1:1, a subframe pattern of 1:1 meaning that the first RAT has higher priority to obtain radio resources in a subframe, followed by a subframe for which the second RAT has higher priority to obtain radio resources; and a time between a subframe pattern for uplink transmissions and a subframe pattern for downlink transmissions being based at least in part on at least one of:

a delay between resource arbitration and downlink or uplink transmission scheduling:

a delay between scheduling and transmission of a downlink assignment or uplink grant on a physical downlink control channel, PDCCH;

a delay between transmission of a downlink assignment and a corresponding physical downlink shared channel, PDSCH transmission;

a delay between transmission of an uplink grant and a corresponding physical uplink shared channel, PUSCH, transmission; and a time when uplink radio resources are arbitrated when multiple k2 values are supported.

10. The network node of claim 9, wherein the first RAT is New Radio, NR, and the second RAT is Long Term Evolution, LTE.

11. The network node of claim 9, wherein resource blocks of a subframe are assigned to communications of the higher priority RAT before remaining resource blocks of the subframe are assigned to communications of the lower priority RAT.

12. The network node of claim 9, wherein a subframe pattern repeats.

13. The network node of claim 9, wherein a subframe pattern can change dynamically.

14. The network node of claim 9, wherein the demand for resources for the first RAT is estimated for each of a plurality of first traffic priority groups and the demand for resources for the second RAT is estimated for each of a plurality of second traffic priority groups.

15. The network node of claim 9, wherein of a subframe pattern is performed separately for downlink transmissions and uplink transmissions.

16. The network node of claim 9, wherein a first number of time slots between a time of a downlink assignment for a downlink transmission and a time of the downlink transmission is zero and a second number of time slots between a time of an uplink assignment for an uplink transmission and a time of the uplink transmission is one of 2 and 4.

* * * * *